June 24, 1924.

A. HOLLANDER

CENTRIFUGAL PUMP

Filed July 5, 1922

1,499,056

WITNESS

Inventor
Aladar Hollander
BY
ATTORNEYS

Patented June 24, 1924.

1,499,056

UNITED STATES PATENT OFFICE.

ALADAR HOLLANDER, OF BELLEVILLE, NEW JERSEY.

CENTRIFUGAL PUMP.

Application filed July 5, 1922. Serial No. 572,829.

*To all whom it may concern:*

Be it known that I, ALADAR HOLLANDER, a citizen of the United States, and resident of the town of Belleville, in the county of Essex and State of New Jersey, have invented certain new and useful Improvements in Centrifugal Pumps, of which the following is a specification.

The main object of the invention is to provide a simple, effective and inexpensive reversible means for taking up the wear caused by the lateral thrust on the rotating elements of the pump and reset thereby the rotating element.

In my co-pending application for Patent Serial No. 571,883, now Patent No. 1,485,504, dated March 4, 1924, I have shown and described means whereby the thrust on the impellers tending to move the impeller shaft toward the intake or suction side of the pump is balanced by a thrust in the opposite direction on a balancing disk carried by the impeller shaft at the discharge end of the pump and subject to the high-pressure water at that point. The thrust balancing disk is adapted to bear against a ring seat. This seat is subject to wear, and excessive wear on said seat would result in an excessive lateral or axial movement of the impeller shaft and the impellers. The invention herein consists in providing a reversible ring seat which when worn on one side may be reversed to present the unworn side to the thrust balancing disk. The invention further consists in providing a reversible thrust balancing disk having hubs of different lengths so that the disk may be reversed in order to still further compensate for wear on the bearing ring and also on the disk and thereby bring back into original position the impeller shaft and impellers.

Figure 1:
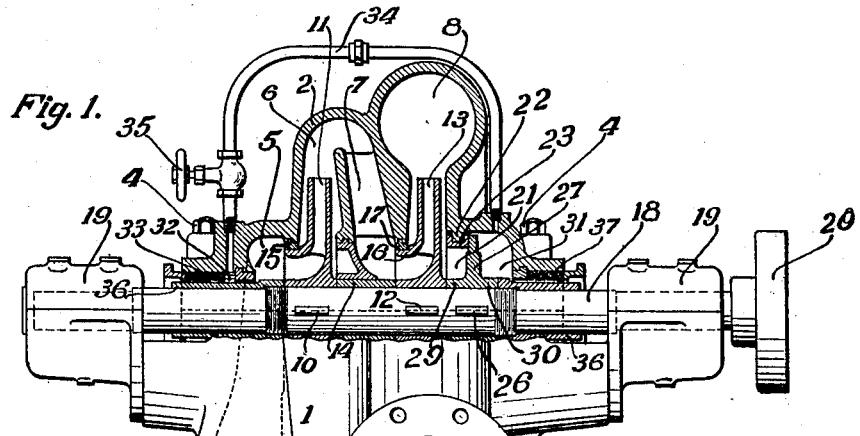
Figures 2, 3, 4:
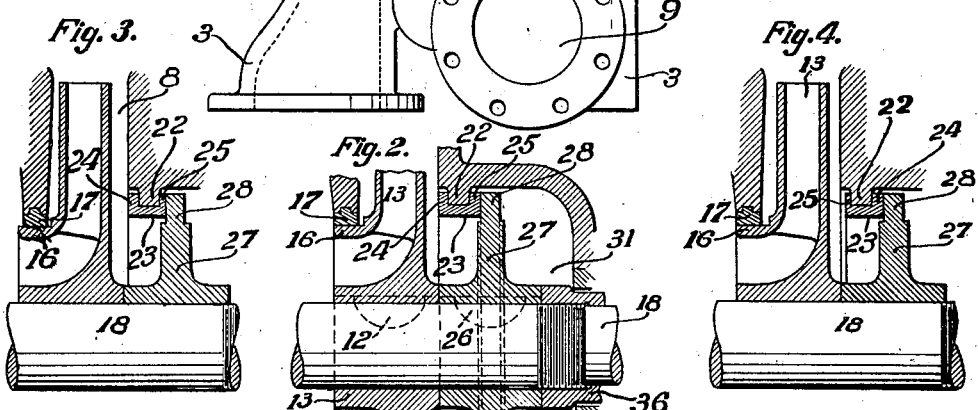
Figures 5, 6:
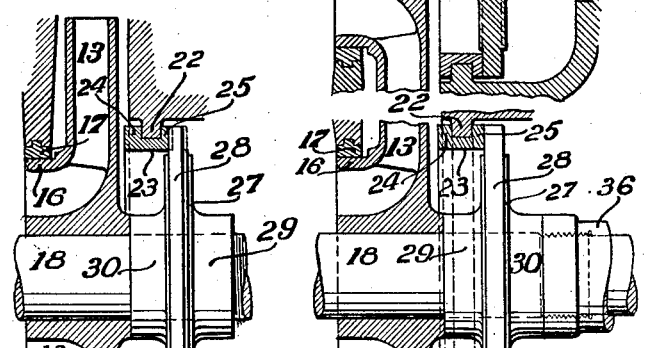
Figure 7:
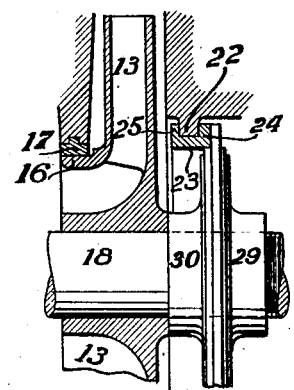

In the drawing, Fig. 1 is a side elevation, partly in central vertical section, of a centrifugal pump embodying the invention;

Fig. 2 a detail vertical sectional view showing the reversible bearing ring and the thrust balancing disk;

Fig. 3 a view similar to Fig. 2, showing the bearing ring worn down on one side;

Fig. 4 a view similar to Fig. 3, showing the worn bearing ring reversed to bring the unworn surface into contact with the thrust balancing disk;

Fig. 5 a detail sectional view similar to Fig. 2, showing the thrust balancing disk provided with two hubs of different lengths;

Fig. 6 a view similar to Fig. 3, showing the thrust balancing disk reversed on the impeller shaft from the position shown in Fig. 5, the bearing ring being worn on one side; and Fig. 7 a view similar to Fig. 6, showing the worn bearing ring reversed from the position shown in Fig. 6, and also showing the thrust balancing disk reversed from the position shown in Fig. 6, to bring the impellers back into their normal position.

Referring to the various parts by numerals, 1 designates the lower half of the pump casing and 2 the upper half thereof. The lower half of the casing is formed with the supporting standards 3, and the upper half is bolted to the lower half by means of bolts 4. Extending longitudinally through the casing is an impeller shaft 18 which is mounted in suitable bearings 19, and to one end of which is connected a coupling 20. The standard 3 at the left-hand end of the pump casing is hollow and constitutes the intake of the pump and is connected to the water supply. The intake is connected directly to an intake and suction chamber 5 which surrounds the impeller shaft and is in communication with the first pressure chamber 6 in the pump casing. The chamber 6, at its outer margin, is in communication with an intake chamber 7 and said intake chamber 7 is in communication with a high-pressure discharge chamber 8 at the discharge end of the pump. Chamber 8 is in communication with a discharge outlet 9. Rigidly keyed to the impeller shaft by a key 10 is an impeller 11, said impeller operating in the pressure chamber 6. This impeller is provided with the usual radial nozzles which open at their inner ends through the hub of the impeller directly into the suction chamber 5 and receive water from said suction chamber and discharge it into the pressure chamber 6. Secured rigidly to the impeller shaft by a key 12 is an impeller 13, said impeller being located in pressure chamber 8 and, like the impeller 11, being formed with radial nozzles which open at their inner ends through the hub of the impeller and receive water directly from the intake chamber 7. The impellers are spaced apart on the impeller shaft by means of a sleeve 14. The division wall of the casing between the suction chamber 5 and the first pressure chamber 6 is provided with a sealing ring 15, said ring being provided with an annular exterior rib which fits a corresponding groove in the partition wall in order to lock the ring against lateral or axial movement. The eye of the impeller 11 is formed with an annular hub-like part 16 which fits closely within the sealing ring 15 and is of sufficient length to permit a slight lateral or axial sliding movement of the impeller. The division wall between the pressure chamber 8 and the intake chamber 7 is provided with a sealing ring 17 and the eye of the impeller 13 fits and slides within said sealing ring precisely as described with respect to the impeller 11.

In the operation of pumps of this construction there is a certain amount of excess pressure on the high-pressure sides of the impellers, due to the fact that there is a larger area exposed to the high-pressure water. This excess pressure results in a thrust on the impellers and on the impeller shaft, directed toward the suction or intake side of the pump. It is the main object of this invention to provide means to counterbalance or neutralize this excess pressure and the thrust resulting therefrom; and also to make said thrust counterbalancing means reversible for the purpose of compensating for wear therein.

In the pump casing, at the discharge end thereof, is formed a balancing pressure chamber 21. This chamber is annular, extending around the impeller shaft, and is in open communication with the high-pressure discharge chamber 8 so that the high-pressure water will freely enter the chamber 21. The annular wall of the chamber 21 is formed with an inwardly extending annular rib 22 which is engaged by an annular seat or thrust ring 23, said seat being grooved on its exterior surface to receive the rib on the wall of the chamber 21. The thrust ring 23 is therefore formed with two wearing surfaces 24 and 25 which are of the same thickness and perpendicular to the axis of the impeller shaft. Rigidly secured to the impeller shaft by a key 26, or otherwise, is a thrust balancing disk 27, said disk forming one wall of the balancing pressure chamber 21, so that the water in said chamber will exert its pressure directly against the said disk and tend to move the impeller shaft toward the discharge end of the pump and in opposition to the excess pressure exerted on the high-pressure sides of the impellers. The thrust balancing disk 27 is formed with an annular bearing portion 28 which is adapted to engage the outer or right-hand side of the thrust ring 23 and thereby close the balancing pressure chamber 21. The thrust balancing disk is formed with two hubs 29 and 30 extending outwardly from opposite sides of the thrust balancing disk. The hub 29 is slightly longer than the hub 30, for a purpose which will be hereinafter described, and its outer edge is adapted to bear directly against the hub of the high-pressure impeller 13. A counterbalancing pressure chamber 31 is formed between the outer or right-hand side of the thrust balancing disk 27 and the outer wall of the pump casing. This counterbalancing pressure chamber is sealed from the chamber 21 when the thrust disk is in contact with the thrust ring 23, and is in communication with said chamber 21 when the thrust disk is moved to the right away from the thrust ring, as will be hereinafter described.

A sealing chamber 32 is formed in the pump casing between the intake chamber 5 and a stuffing box 33 on the suction side of the pump. This sealing chamber extends around the impeller shaft and is in communication with the intake chamber 5 through a sleeve mounted in the pump casing and surrounding the impeller shaft. The sealing chamber is in communication with the counterbalancing chamber 31 through a pipe 34 so that water from the counterbalancing chamber will flow directly into the sealing chamber and from this latter chamber into the intake chamber 5 and around the impeller shaft. A manually operable valve 35 is arranged in the pipe 34 in order to regulate the flow of water through pipe 34 from the counterbalancing chamber 31.

Threaded on each end of the impeller shaft is a locking sleeve 36, said sleeves holding the impellers and the thrust balancing disk against axial movement on the shaft. At the discharge end of the pump is arranged a stuffing box 37. The stuffing box 33 is sealed by water from the sealing chamber; and the stuffing box 37 is sealed by water from the counterbalancing pressure chamber 31.

In the operation of pumps of this type the excess pressure on the high-pressure sides of the impellers will force the impeller shaft toward the suction side of the pump. In the arrangement shown in the drawing this movement of the impeller shaft will cause the thrust balancing disk to engage the thrust ring and close communication between the balancing chamber 21 and the counterbalancing chamber 31. As the pressure builds up in the chamber 21 the force exerted on the thrust balancing disk will tend to move the impeller shaft toward the discharge end of the pump and in opposition to the excess pressure on the impellers. The thrust balancing disk is so proportioned in size and area to the impellers that at any speed of the pump, the force exerted on said thrust balancing disk will be slightly in excess of the contrary excessive thrust on the impellers so that the thrust disk will be moved away from the thrust ring and thereby open communication between the chamber 21 and the counterbalancing pressure chamber 31 and permit high-pressure water to escape from chamber 21 around the thrust balancing disk into the counterbalancing chamber 31. When sufficient pressure has been built up in the counterbalancing chamber 31 the axial movement of the impeller shaft will be stopped. Water will flow from the chamber 21 through pipe 34 into the sealing chamber and thence into the intake chamber 5, and the rate of this flow will be governed by the position of the valve 35.

It is manifest that there will be wear on the contacting surfaces of the thrust ring and the thrust balancing disk. When one of the wearing surfaces 24 or 25 has been so reduced in thickness as to permit the impeller shaft and the impellers to have an excessive movement toward the suction side of the pump, as shown in Fig. 3, the thrust ring may be reversed to bring the unworn bearing surface into engagement with the thrust balancing disk, as shown in Figs. 4 and 7. This reversal of the thrust ring can be brought about by removing the upper section of the pump casing and then removing the impeller shaft from its bearings. Of course the thrust disk must also be disconnected from the impeller shaft. When the parts are assembled with the thrust ring reversed, it is manifest that the thrust disk and the impellers will be restored to their original normal position and the impeller shaft will be restricted to its normal amount of lateral or axial movement.

In order to take up for the wear on the thrust ring, without reversing the thrust ring, and to prevent excessive lateral or axial movement of the impeller shaft, the thrust disk may be reversed on the shaft. In the normal or original arrangement of the thrust disk the longer hub 29 is in engagement with the high-pressure impeller 13, as shown in Fig. 5. When there is excessive lateral movement of the impeller shaft due to the wear of the thrust ring, the thrust disk may be reversed to bring the shorter hub 30 into engagement with the high-pressure impeller 13, as shown in Fig. 6. This will compensate for the wear on the thrust ring and reduce the lateral or axial movement of the impeller to normal.

It is manifest, therefore, that the thrust ring may be reversed in order to take up wear and to reduce the lateral play of the impeller shaft, and then the thrust disk may be reversed in its position on the impeller shaft to again take up the wear on the thrust ring and to reduce the excessive lateral movement of the impeller shaft. It is also manifest that by reversing the thrust disk the wear on one side of the thrust disk may be compensated for.

In Figs. 2, 3 and 4 the thrust disk is shown as provided with hubs of equal length. In Figs. 1, 5, 6 and 7 the thrust disk is shown with hubs of unequal lengths.

What I claim is:—

1. A centrifugal pump comprising a casing formed in two longitudinally separable halves, a rotary impeller shaft having a slight axial movement, an intake chamber at the suction end of the pump, a high-pressure chamber at the discharge end of the pump, rotary centrifugal means mounted on the impeller shaft and directing the water from the intake chamber to the high-pressure discharge chamber, a balancing pressure chamber at the discharge end of the pump and in communication with the high-pressure discharge chamber, a thrust-balancing disk rigidly mounted on the shaft and subject to pressure in the balancing pressure chamber, a counter-balancing pressure chamber on the opposite side of said disk from the balancing pressure chamber, the said disk controlling communication between said two chambers, and a reversible thrust ring and seat for the disk, said thrust ring being formed with a groove around its outer edge and the pump casing being formed with a split rib extending around the inner sides of its two halves and adapted to be received in the groove in the thrust ring.

2. A centrifugal pump comprising a casing, a rotary impeller shaft having a slight axial movement, an intake chamber at the suction end of the pump, a high-pressure chamber at the discharge end of the pump, rotary centrifugal means mounted on the impeller shaft and directing the water from the intake chamber to the high-pressure discharge chamber, a balancing pressure chamber at the discharge end of the pump and in communication with the high-pressure discharge chamber, a reversible thrust balancing disk mounted on the shaft for axial movement therewith and subject to the pressure in the balancing pressure chamber, said disk being formed with hubs of different lengths projecting from opposite sides thereof, a counter-balancing pressure chamber on the opposite side of said disk from the balancing pressure chamber, the said disk controlling communication between said two chambers, means in the balancing pressure chamber adapted to be engaged by the thrust disk, and means to permit a limited flow of water from the counter-balancing pressure chamber.

3. A fluid pressure mechanism comprising a casing formed in longitudinally separable halves, a rotary impeller shaft having a slight axial movement, an impeller fixed to said shaft, an intake chamber at the suction end of the mechanism, a balancing pressure chamber at the discharge end of the mechanism and adapted to receive the fluid at high pressure, a thrust balancing element fixed to the impeller shaft to rotate and move axially therewith and subject to the pressure in the balancing pressure chamber, a counter balancing pressure chamber on the opposite side of said thrust balancing element from the balancing pressure chamber said element controlling communication between said two chambers, an inwardly extending annular rib carried by the two halves of the casing said rib being split diametrically on the plane of division of the casing halves, and a reversible ring seat for the thrust balancing element said ring seat being formed with a groove extending around its outer edge and adapted to receive the said annular rib.

4. A fluid pressure mechanism comprising a casing formed in longitudinally separable halves, a rotary impeller shaft having a slight axial movement, an impeller fixed to said shaft, an intake chamber at the suction end of the mechanism, a balancing pressure chamber at the discharge end of the mechanism and adapted to receive the fluid at high pressure, a thrust balancing element fixed to the impeller shaft to rotate and move axially therewith and subject to the pressure in the balancing pressure chamber, a counter-balancing pressure chamber on the opposite side of said thrust-balancing element from the balancing pressure chamber said element controlling communication between said two chambers, an inwardly extending annular rib formed on the inner sides of the halves of the casing said rib being split diametrically on the plane of division of the casing halves the said thrust balancing element being of such size that its outer marginal edge overlaps the said rib on the casing, and a reversible ring seat for said rotatable element said ring seat being formed with a groove extending around its outer edge and adapted to receive said annular rib, whereby the ring seat is held in place and one side thereof is interposed between the said rib and the overlapping edge of the thrust balancing element.

5. A fluid pressure mechanism comprising a casing formed in longitudinally separable halves, a rotary impeller shaft having a slight axial movement, an impeller fixed to said shaft, an intake chamber at the suction end of the mechanism, a balancing pressure chamber at the discharge end of the mechanism and adapted to receive the fluid at high pressure, a thrust balancing element fixed to the impeller shaft to rotate and move axially therewith and subject to the pressure in the balancing pressure chamber said element being reversible and formed with hubs of different lengths projecting from the opposite sides thereof, a counter-balancing pressure chamber on the opposite side of said thrust balancing element from the balancing pressure chamber, said element controlling communication between said two chambers, an inwardly extending annular rib formed on and extending around the inner sides of the casing halves, and a reversible ring seat for said rotatable element, said ring seat being formed with a groove extending around its outer edge and adapted to receive the said annular rib within the casing.

In testimony whereof I hereunto affix my signature.

ALADAR HOLLANDER.